(12) United States Patent
Cuyt et al.

(10) Patent No.: US 11,325,309 B2
(45) Date of Patent: May 10, 2022

(54) THREE-DIMENSIONAL PRINTING SYSTEM WITH IMPROVED PROCESS CHAMBER

(71) Applicant: LayerWise NV, Leuven (BE)

(72) Inventors: Luc Cuyt, Puurs-Sint-Amands (BE); Brawley Valkenborgs, Kessel-lo (BE); Jonas Van Vaerenbergh, Nieuwkerken-Waas (BE); Jan Van Rompay, Geel (BE)

(73) Assignee: Layerwise NV, Leuven (BE)

( * ) Notice: Subject to any disclaimer, the term of this patent is extended or adjusted under 35 U.S.C. 154(b) by 0 days.

(21) Appl. No.: 16/999,406

(22) Filed: Aug. 21, 2020

(65) Prior Publication Data

US 2021/0053290 A1 Feb. 25, 2021

(30) Foreign Application Priority Data

Aug. 23, 2019 (EP) .................................... 19193375

(51) Int. Cl.
*B29C 64/25* (2017.01)
*B29C 64/371* (2017.01)
(Continued)

(52) U.S. Cl.
CPC ............ *B29C 64/371* (2017.08); *B22F 10/00* (2021.01); *B29C 64/153* (2017.08); *B29C 64/25* (2017.08);
(Continued)

(58) Field of Classification Search
CPC ..... B29C 64/25; B29C 64/364; B29C 64/371; B22F 12/38; B01J 3/03; E05B 47/0603; E05B 63/0052
See application file for complete search history.

(56) References Cited

U.S. PATENT DOCUMENTS 1,147,921 A * 7/1915 Berry ...................... E05C 19/02
292/71
2,529,478 A * 11/1950 Bach ....................... E05F 11/12
220/263
(Continued)

FOREIGN PATENT DOCUMENTS

CN 107695349 A 2/2018
CN 208881184 U 5/2019
(Continued)

OTHER PUBLICATIONS

European Patent Office, "Extended European Search Report for European Patent Application No. 19193375.3", dated Feb. 28, 2020, 12 pages.
(Continued)

*Primary Examiner* — Timothy Kennedy (57) ABSTRACT

A three-dimensional printing system for manufacturing a three-dimensional article includes a chassis, a door, and a plurality of latches. The chassis defines an internal process chamber and a vertical opening for accessing the internal process chamber. A peripheral seal surrounds the vertical opening. The plurality of latches are arranged around the peripheral seal. The latches individually include a hook. The vertical door is mounted to the chassis by a linkage. The door includes a plurality of laterally extending pins individually corresponding to the latches. The pins have locations along the door to be individually engaged by the latches when the door is positioned in the closed position. The latches are individually configured to rotate the hooks around a second lateral axis (Y) when the door is positioned in the closed position with the door closing over the opening to secure the door with respect to a first lateral axis (X).

13 Claims, 8 Drawing Sheets

(51) Int. Cl.
  *B29C 64/153* (2017.01)
  *B22F 10/00* (2021.01)
  *E05B 47/06* (2006.01)
  *E05B 63/00* (2006.01)
  *B33Y 30/00* (2015.01)
  *B33Y 40/00* (2020.01)
  *B22F 10/10* (2021.01)

(52) U.S. Cl.
  CPC ...... *E05B 47/0603* (2013.01); *E05B 63/0052* (2013.01); *B22F 10/10* (2021.01); *B33Y 30/00* (2014.12); *B33Y 40/00* (2014.12)

(56) References Cited

U.S. PATENT DOCUMENTS

| | | | | |
|---|---|---|---|---|
| 3,831,580 A * | 8/1974 | McLean | ............... | F24C 15/022 |
| | | | | 126/197 |
| 4,375,876 A * | 3/1983 | Stewart | ............... | B64C 1/1438 |
| | | | | 160/201 |
| 4,482,113 A * | 11/1984 | Backlund | ............... | B64C 1/1407 |
| | | | | 244/129.5 |
| 4,510,714 A * | 4/1985 | Kasper | ............... | B64C 1/1415 |
| | | | | 244/129.5 |
| 5,064,147 A * | 11/1991 | Noble | ............... | B64C 1/143 |
| | | | | 244/129.5 |
| 6,068,305 A * | 5/2000 | Myers | ............... | E05B 17/0029 |
| | | | | 292/201 |
| 7,604,265 B2 * | 10/2009 | Tsai | ............... | E05B 65/0858 |
| | | | | 292/116 |
| 10,124,884 B2 * | 11/2018 | Walke | ............... | F16H 25/14 |
| 2004/0227358 A1 * | 11/2004 | Kachouh | ............... | E05B 85/26 |
| | | | | 292/216 |
| 2005/0194795 A1 * | 9/2005 | Hapke | ............... | E05B 17/0025 |
| | | | | 292/216 |
| 2006/0071478 A1 | 4/2006 | Denys | | |
| 2015/0068509 A1 * | 3/2015 | Gayle | ............... | F24C 15/022 |
| | | | | 126/197 |
| 2017/0129585 A1 * | 5/2017 | Erben | ............... | B64C 1/143 |
| 2017/0259339 A1 * | 9/2017 | Riva | ............... | B22F 10/20 |

FOREIGN PATENT DOCUMENTS

| | | | |
|---|---|---|---|
| DE | 3903118 A1 * | 8/1990 | ............... E05C 9/02 |
| GB | 2470108 A | 11/2010 | |

OTHER PUBLICATIONS

ASTM International, "Standard Terminology for Additive Manufacturing—General Principles—Terminology", ISO/ASTM 52900:2015(E), pp. 947-955.

\* cited by examiner

THREE-DIMENSIONAL PRINTING SYSTEM WITH IMPROVED PROCESS CHAMBER

CROSS-REFERENCE TO RELATED APPLICATIONS

This application claims the benefit of priority through the Paris convention to European application 19193375.3 filed on Aug. 23, 2019. This prior application is incorporated herein by reference.

FIELD OF THE INVENTION

The present disclosure concerns an apparatus and method for a layer-by-layer fabrication of three dimensional (3D) articles utilizing powder materials. More particularly, the present disclosure concerns a closure system for a process chamber utilizing vacuum and inert gas.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused at a build plane using an energy beam such as a laser, electron, or particle beam. Higher productivity printers can utilize multiple energy beams. Some of these systems require the use of inert gases and very high powered energy beams. One challenge is providing a convenient method of opening and closing such machines while maintaining seal integrity and safety.

CN 107 695 349 discloses an inert gas dynamic balance system for a 3D printing system. The system comprises an airtight box, a gas path circulating assembly and a purification assembly, wherein the airtight box is used for providing an airtight operation space for 3D printing; the gas path circulating assembly communicates with the airtight box and used for providing inert gas for the airtight box during 3D printing/before 3D printing, so that an inert gas atmosphere and a circulating gas path are formed in the airtight box; and the purification assembly communicates with the airtight box and used for purifying gas in the inert gas atmosphere. The inert gas dynamic balance system can provide the inert gas atmosphere for printing of metal powder prone to being oxidized.

CN 208 881 184 discloses a material storing device for a 3D printing system.

SUMMARY

In a first aspect of the disclosure, a three-dimensional printing system for manufacturing a three-dimensional article includes a chassis, a door, and a plurality of latches. The chassis defines an internal process chamber and a vertical opening for accessing the internal process chamber from outside of the chassis. A peripheral seal surrounds the vertical opening and the plurality of latches are arranged around the peripheral seal. The latches individually include a hook. The vertical door is mounted to the chassis by a linkage. The linkage allows the door to translate between open and closed positions. The door includes a plurality of laterally extending pins that individually correspond to the latches. The pins have locations along the door to be individually engaged by the latches when the door is positioned in the closed position. The latches are individually configured to rotate the hooks around a second lateral axis (Y) when the door is positioned in the closed position with the door closing over the opening to secure the door with respect to a first lateral axis (X) that is perpendicular to the second lateral axis (Y).

In one implementation the plurality of latches includes two vertical arrangements of latches including a first vertical arrangement and a second vertical arrangement. The two vertical arrangements are spaced apart along the second lateral axis (Y) and are at opposing vertical sides of the opening. The first vertical arrangement can include three latches. The second vertical arrangement can include two latches. The linkage can include a first vertical axis of rotation on the chassis that is proximate to the second vertical arrangement of latches. The linkage can include a second vertical axis of rotation on the door that is generally laterally centered on the door. The second vertical arrangement of latches is between a portion of the peripheral seal and the second vertical axis of rotation.

In another implementation the latches individually include an actuator that expands to rotate the hook about the second lateral axis (Y) to the engaged or latched position. The hook can have a proximal end and a distal end; the distal end defines a concave surface for capturing or latching or engaging the hook. The latches individually can include an upper mount and a lower mount; the proximal end of the hook is rotatively mounted to the upper mount; the actuator is coupled between the upper mount and the lower mount. The chassis can define a vertical wall with a front side and a back side and a slot therethrough; the upper and lower mounts are attached to the backside of the vertical wall; expansion of the actuator causes the hook to extend out of the slot and past the front side of the wall to engage or latch or capture the pin.

In yet another implementation the three-dimensional printing system further includes a gas handling system, a motorized platen, a powder dispenser, and a beam system. The controller is further configured to: (1) operate the latches to engage the door, (2) operate the gas handling system to evacuate ambient air from the process chamber, (3) operate the gas handling system to backfill the process chamber with inert gas, and (4) operate the motorized platen, the powder dispenser, and the beam system to fabricate the three-dimensional article in a layer-by-layer manner.

In a further implementation, closing the door causes the hooks to partially engage the pins before evacuation of the ambient air. Partial engagement is initial rotation leaving a gap between a concave capture surface and the pin. Evacuation of the ambient air then causes the hooks to fully engage the pins with additional rotation of the hook that closes the gap.

In a second aspect of the disclosure, a method of manufacturing a three-dimensional article with a system having a chassis defining an internal process chamber and a vertical opening and a door attached to the chassis includes: (1) translating the door from an open position to a closed position; a plurality of pins extend laterally from opposed vertical sides of the door and line up with a plurality of latches that are arranged about the opening; the plurality of latches individually have hooks, (2) activating the plurality of latches to rotate the hooks to engage the plurality of pins, (3) activating a gas handling system to evacuate ambient air from the internal process chamber, (4) activating the gas handling system to backfill the internal process chamber with an inert gas, and (5) operating a motorized platen, a powder dispenser, and a beam system to fabricate the three-dimensional article in a layer-by-layer manner.

The process chamber is typically a large chamber. The evacuation and backfilling with inert gas exerts very large forces on the door. For process integrity and safety, a very reliable seal is required. The plurality of hooks arranged around a periphery of the opening provides a robust and uniform force for supporting the door against the negative and positive gas pressures. Other features that improve seal integrity include the two-hinge linkage for mounting the door, the two vertical arrangements of latches, and the particular latch design itself. The application of vacuum allows the latches to move from the partial to full latch position. The full latch position provides a very robust support against the incoming pressure of inert gas.

DETAILED DESCRIPTION OF THE PREFERRED EMBODIMENTS

Figure 1:
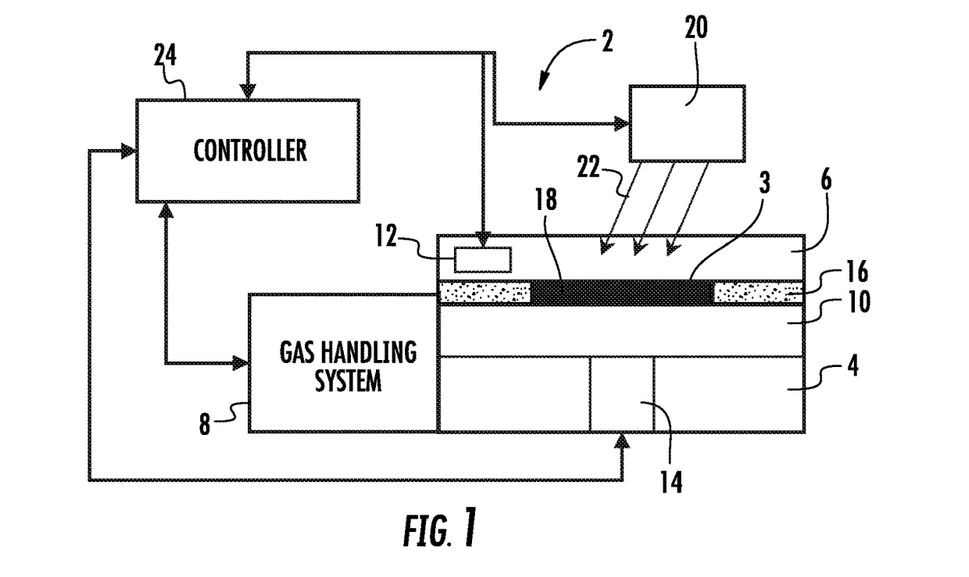
FIG. 1 is a schematic diagram of an embodiment of a three-dimensional printing system during a fabrication of a three-dimensional article.

FIG. 1 is a schematic diagram of an embodiment of a three-dimensional printing system 2 during a fabrication of a three-dimensional article 3. In describing system 2, mutually orthogonal axes X, Y, and Z can be used. Axes X and Y are lateral axes and generally horizontal. Axis Z is a vertical axis that is generally aligned with a gravitational reference. By "generally" we mean that a measure such as a quantity, a dimensional comparison, or an orientation comparison is by design and within manufacturing tolerances but as such may not be exact. In the description X will be referred to as a first lateral axis and Y will be referred to as a second lateral axis.

System 2 includes a chassis 4 defining an internal process chamber 6 that is coupled to a gas handling system 8. Gas handling system 8 is configured to manage a pressure and composition of gas inside the process chamber 6. Gas handling system 8 can include a vacuum pump for removing ambient air or other gas from chamber 6. Gas handling system 8 also includes gas sources for backfilling chamber 6 with an inert gas. In the illustrated embodiment, the inert gas is argon.

Within the process chamber 6 is a motorized platen 10. System 2 also includes a powder dispenser 12 for dispensing layers of powder 16 over platen 10. An upper surface 18 of a just dispensed layer of powder 16 is referred to as a build plane 18. In the illustrated embodiment, the powder is a metal powder such as titanium, stainless steel, a metal-ceramic, a metal alloy, an elemental metal or a mixture thereof.

A beam system 20 is configured to generate one or more energy beams 22 and to scan the beam(s) across the build plane 18 to selectively fuse dispensed layer of powder. In an illustrative embodiment, the energy beams are laser radiation beams.

A controller 24 is coupled to portions of the chassis 4 (including motorization 14 of the platen 10), the gas handling system 8, the powder dispenser 12, the beam system 20, and other portions of the three-dimensional printing system 2. Controller 20 includes a processor coupled to an information storage device. The information storage device includes a non-volatile or non-transient storage device storing software instructions. When executed by the processor, the software instructions control the portions of system 2.

Figure 2:
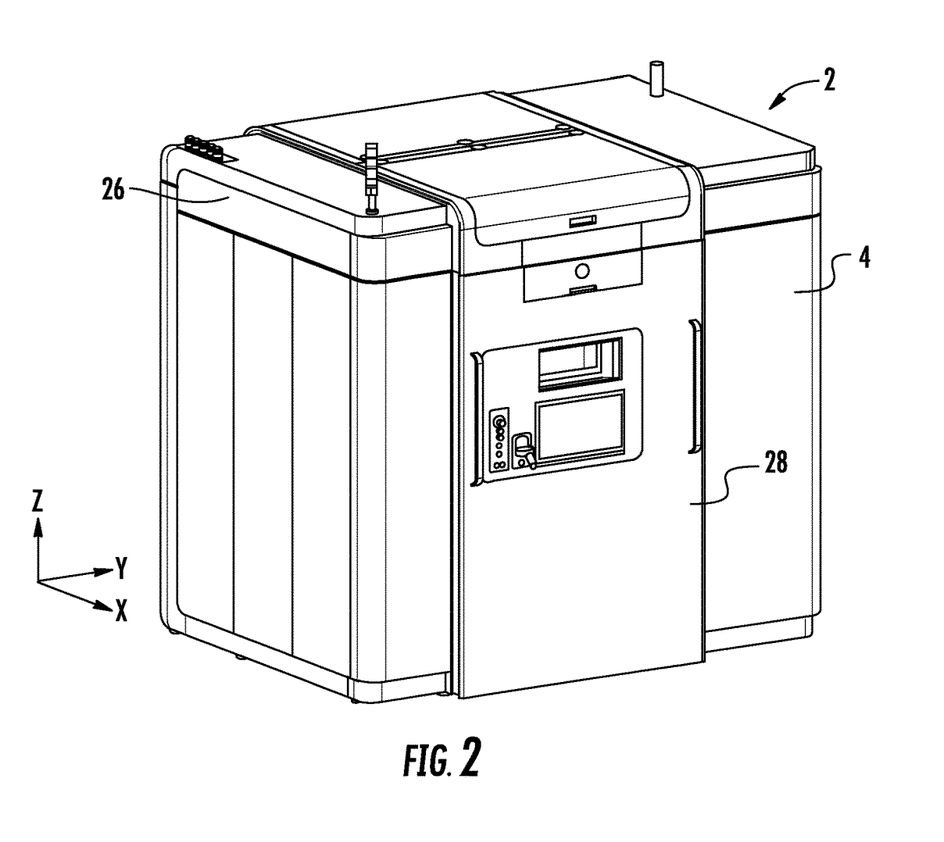
FIG. 2 is an isometric drawing of an embodiment of a portion of three-dimensional printing system including a chassis closed by a door.

FIG. 2 is an isometric drawing of an embodiment of a portion of three-dimensional printing system 2. In the illustrated embodiment, the system 2 has a chassis 4 with an outer housing 26 and a door 28. FIG. 2 depicts the door 28 in a closed position in which the chamber 6 is sealed from an ambient atmosphere. The door 28 is secured to the chassis 4 by a plurality of latches to be illustrated infra. The axes X, Y, and Z in this and subsequent drawings are included to illustrate general directions with respect to the chassis 4.

Figures 3A, 3B:
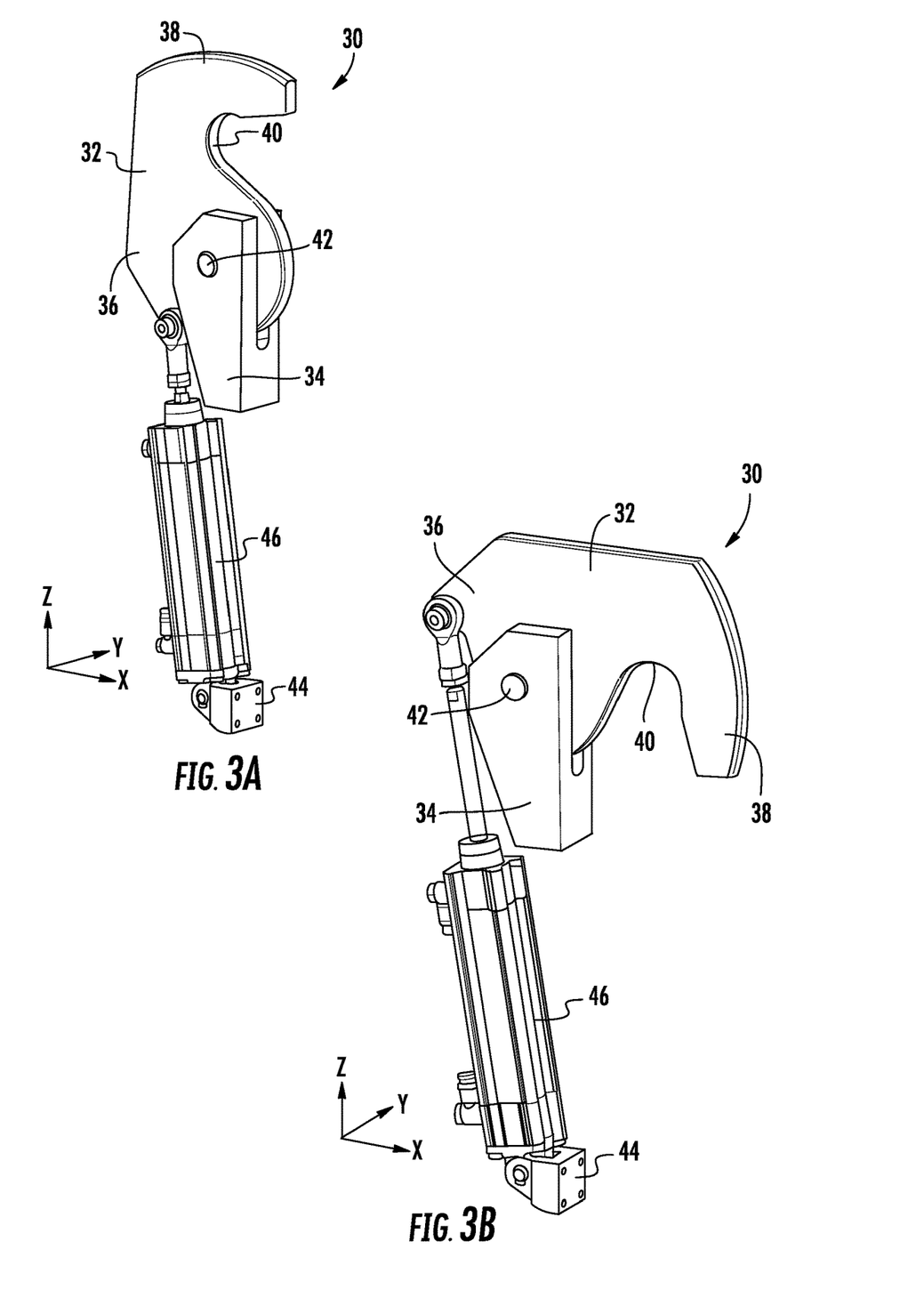
FIG. 3A is an isometric drawing of an embodiment of a latch in isolation in an unlatched configuration.
FIG. 3B is an isometric drawing of an embodiment of a latch in isolation in a latched configuration.

FIGS. 3A and 3B are isometric drawings illustrating an embodiment of a latch 30 in isolation in an unlatched (3A) and latched (3B) configuration. Latch 30 includes a hook 32 that is rotatingly coupled to an upper mount 34. The hook 32 includes a proximal end 36 and a distal end 38. The distal end 38 defines a concave capture surface 40. The proximal end 36 is coupled to upper mount 34 along a hook axis of rotation 42. The hook axis of rotation 42 is parallel to the second lateral axis (Y). The upper mount is affixed to the chassis 4 along a surface parallel to a YZ-plane.

Latch 30 also includes a lower mount 44. Lower mount 44 also mounts to the chassis 4 along a surface parallel to a YZ-plane. Coupled between the lower mount 44 and the hook 32 is a pneumatic actuator 46. The pneumatic actuator 46 has contracted (3A) and extended (3B) positions. With actuator 46 in the contracted position (3A), the proximal end 36 of hook 32 is in a downward position and the distal end 38 is in an upper position so that the hook is unlatched. In the unlatched position (3A) the concave capture surface 40 is facing laterally along the first lateral axis X. With actuator 46 in the expanded position (3B) the proximal end 36 is in a partially raised position and the distal end 38 is in a forward (+X) and lowered position so that the hook is latched. In the latched position (3A) the concave capture surface 40 is facing downward along the vertical axis Z.

Figures 4A, 4B, 4C:
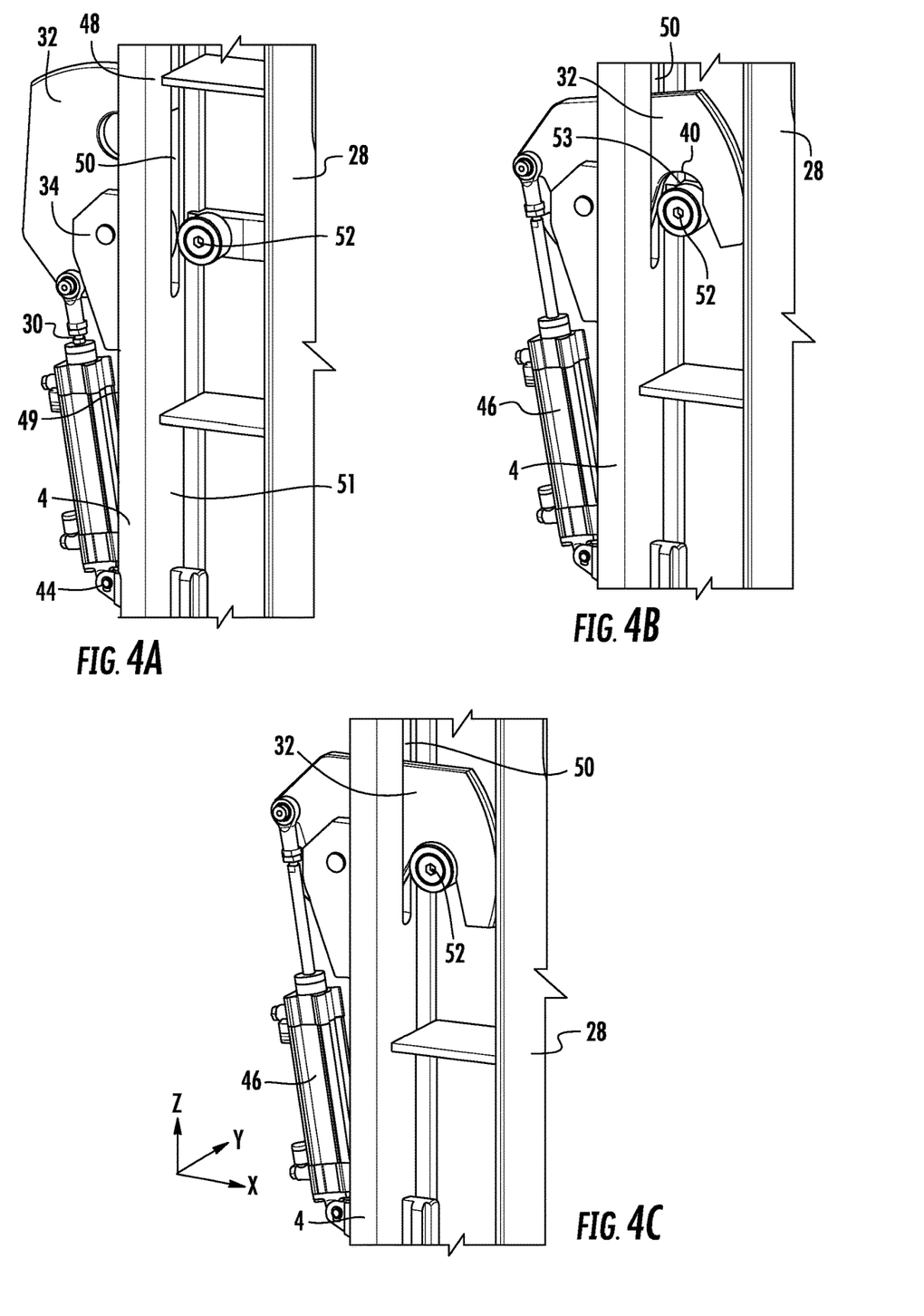
FIG. 4A is an isometric drawing illustrating a portion of a chassis, a door, and a latch in an unlatched state.
FIG. 4B is an isometric drawing illustrating a portion of a chassis, a door, and a latch in a partially latched state.
FIG. 4C is an isometric drawing illustrating a portion of a chassis, a door, and a latch in a fully latched state.

FIGS. 4A-4C are isometric drawings illustrating a portion of the chassis 4 and the door 28 along with a latch 30 in an unlatched (4A), partially latched (4B), and fully latched (4C) state. The chassis 4 includes a vertical wall 48 defining opposed faces that are parallel to the YZ-plane including an inner face 49 and an outer face 51. The upper 34 and lower 44 mounts of latch 30 are affixed to the inner face 49 of vertical wall 48. The vertical wall 48 defines a slot 50 having a major axis that is aligned with vertical axis Z. The door 28 includes a pin 52 that extends laterally along the second lateral axis Y. In the unlatched state, the hook 32 does not extend entirely through the slot 50 which allows the door 28 to be opened and closed without interference with the hook 32.

In the partially latched (4B) state, the hook 32 extends through the slot 50, past the outer face 51, and over the pin 52. The pneumatic actuator 46 is partially extended. The concave capture surface 40 is over the pin 52 but does not fully engage the pin 52. In the partially latched state (4B), there is a vertical gap 53 between the concave capture surface 40 and the pin 52.

In the fully latched (4C) state, the hook 32 extends through the slot 50 and engages the pin 52. The pneumatic actuator 46 is fully extended. The concave capture surface 40 fully engages and captures the pin 52. In moving from partially latched (4B) to fully latched (4C) state, the gap 53 is closed.

Figure 5A:
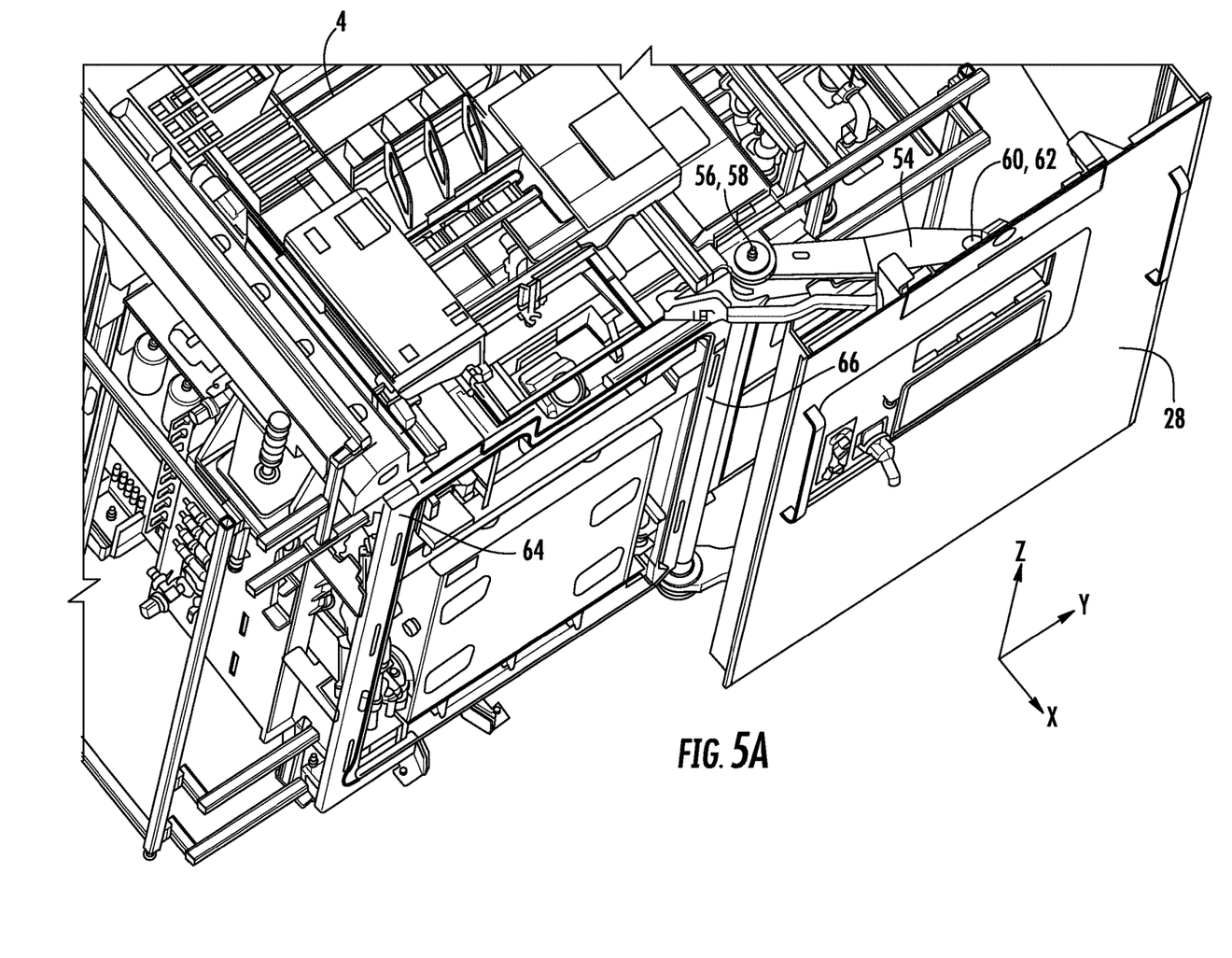
FIG. 5A is an isometric drawing of a portion of a chassis and a door with an outer housing removed from the chassis.

FIG. 5A is an isometric drawing of a portion of the chassis 4 and the door 28 with the outer housing removed 26 from the chassis. A linkage 54 couples the door 28 to the chassis 4. The linkage 54 has a proximal end 56 that rotates about a fixed vertical axis 58 on the chassis 4. The linkage 54 has a distal end 60 that is rotatively coupled to the door 28. The door 28 can rotate about a vertical axis 62. Vertical axis 62 is laterally located at a central or lateral middle of the door 28.

In the illustrated embodiment, there are two vertical arrangements of latches 30 including a first vertical arrangement 64 and a second vertical arrangement 66. The vertical arrangements 64 and 66 are spaced apart along the second lateral axis Y. The vertical axis 58 is proximate to the second vertical arrangement 66.

In the illustrated embodiment, the door 28 is shown in an open position. With the linkage having the fixed 58 and movable 62 axes, the door 28 can be moved from an open position to a closed position while maintaining the door 28 in an orientation in which the major and minor axes of the door define a plane that is generally parallel to the YZ-plane.

Figure 5B:
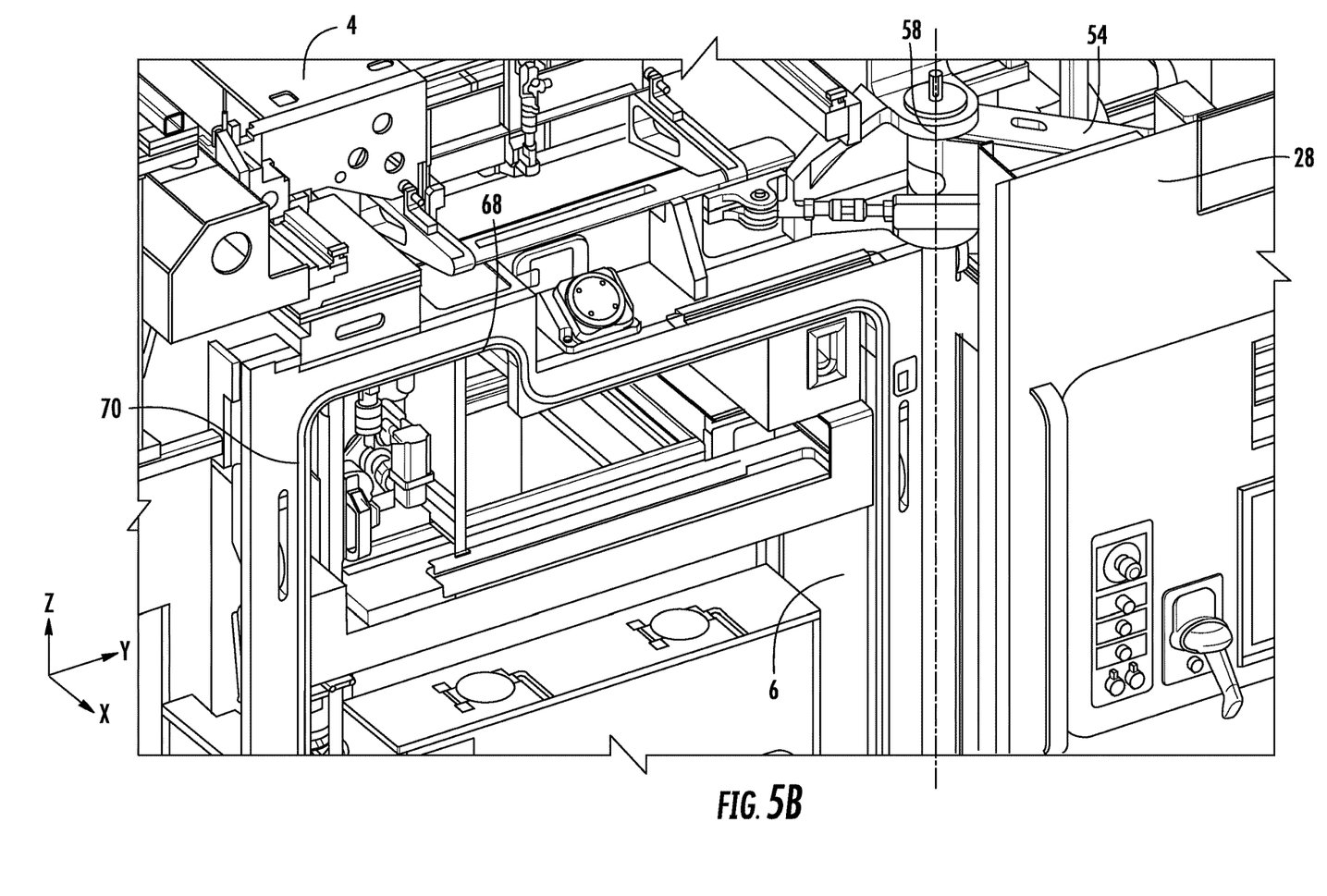
FIG. 5B is an isometric drawing of a portion of a chassis and a door with an outer housing removed from the chassis. Relative to FIG. 5A, FIG. 5B has a different perspective and a greater magnification.

FIG. 5B is an isometric drawing of a portion of the chassis 4 and the door 28 with the outer housing 26 removed from the chassis 4 and the door 28 in the open position. Relative to FIG. 5A, FIG. 5B is a slightly different angular perspective and a higher magnification. With the door 28 in the open position, a vertical opening 68 is exposed that allows access to the process chamber 6. A compressible peripheral seal 70 surrounds the opening 68. The peripheral seal 70 compresses and seals to the door 28 when the door is in a closed position which seals the process chamber 6 from an outside atmosphere. The seal force is generally along the X-axis. As is apparent from FIGS. 5A and 5B, the second vertical arrangement 66 is disposed between the peripheral seal 70 and the vertical axis 58 with respect to axis Y.

Figure 6:
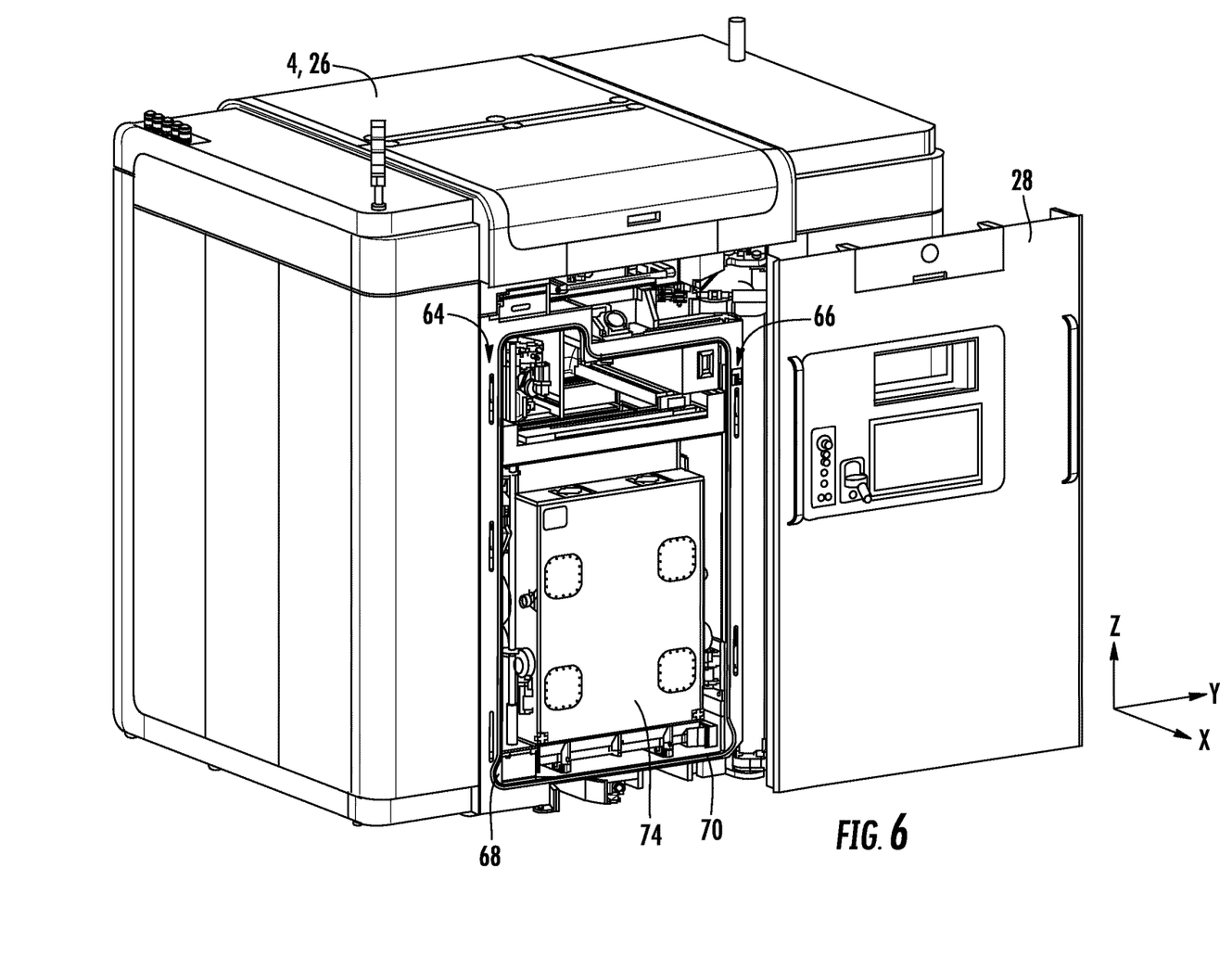
FIG. 6 is an isometric drawing of the chassis with the door open.
Figure 6A:
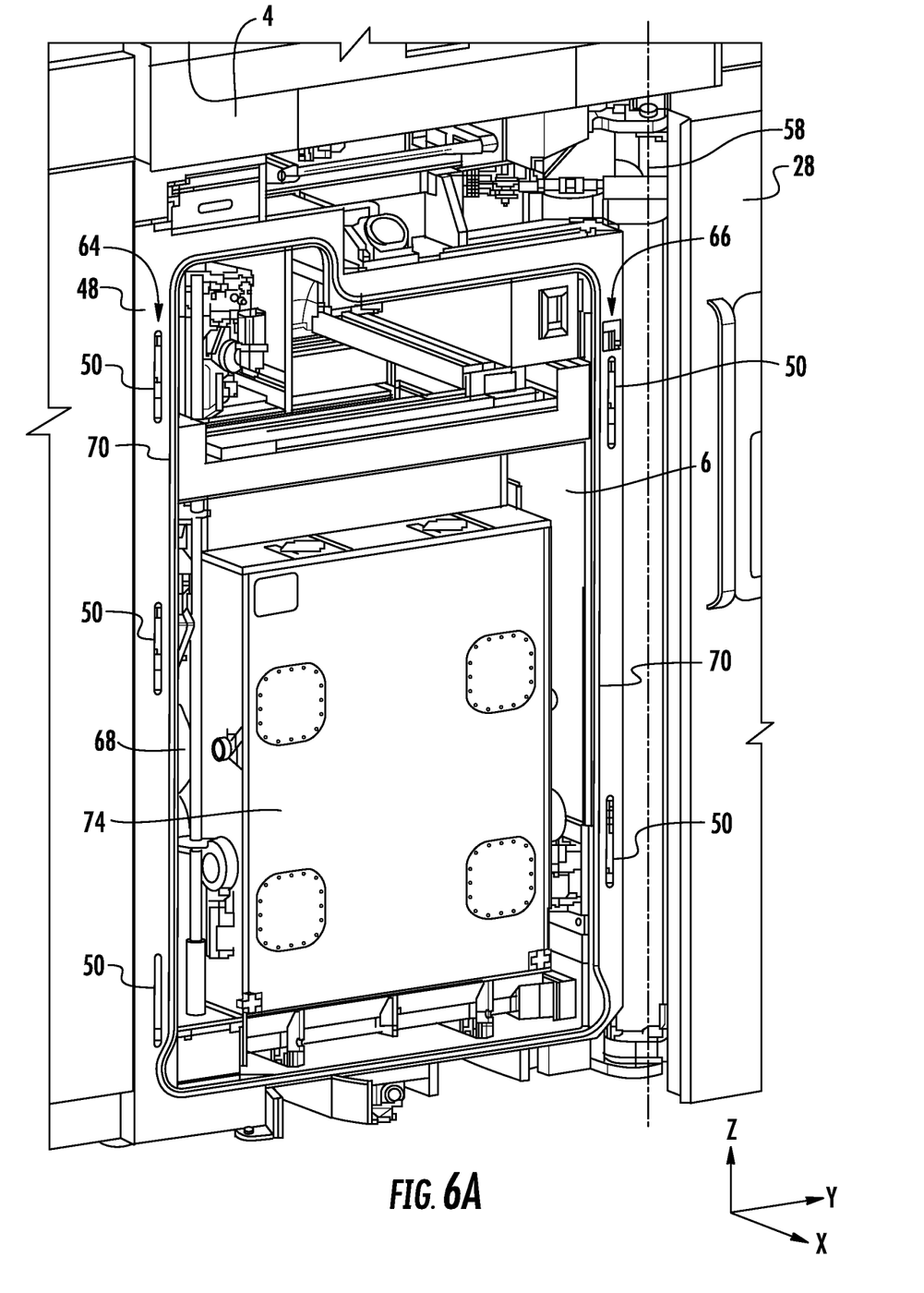
FIG. 6A is a magnified portion of FIG. 6A.

FIGS. 6 and 6A are isometric drawings of the chassis 4 and door 28 in the open configuration. FIG. 6A is a detailed portion of FIG. 6. The latches 30 with hooks 32 (FIG. 4A) are positioned behind the vertical wall 48 having slots 50. The latches 30 individually have an associated slot 50. As illustrated, the first vertical arrangement 64 has three slots 50 (indicating three latches 30). The second vertical arrangement 66 has two slots 50 (indicating two latches 30). The five latches 30 are thus arranged around the peripheral seal 70 which completely surrounds opening 68.

The opening 68 allows access to the process chamber 6. A new build module 74 containing metal powder 16 can be loaded before a fabrication process and then unloaded after a fabrication process.

Figure 7:
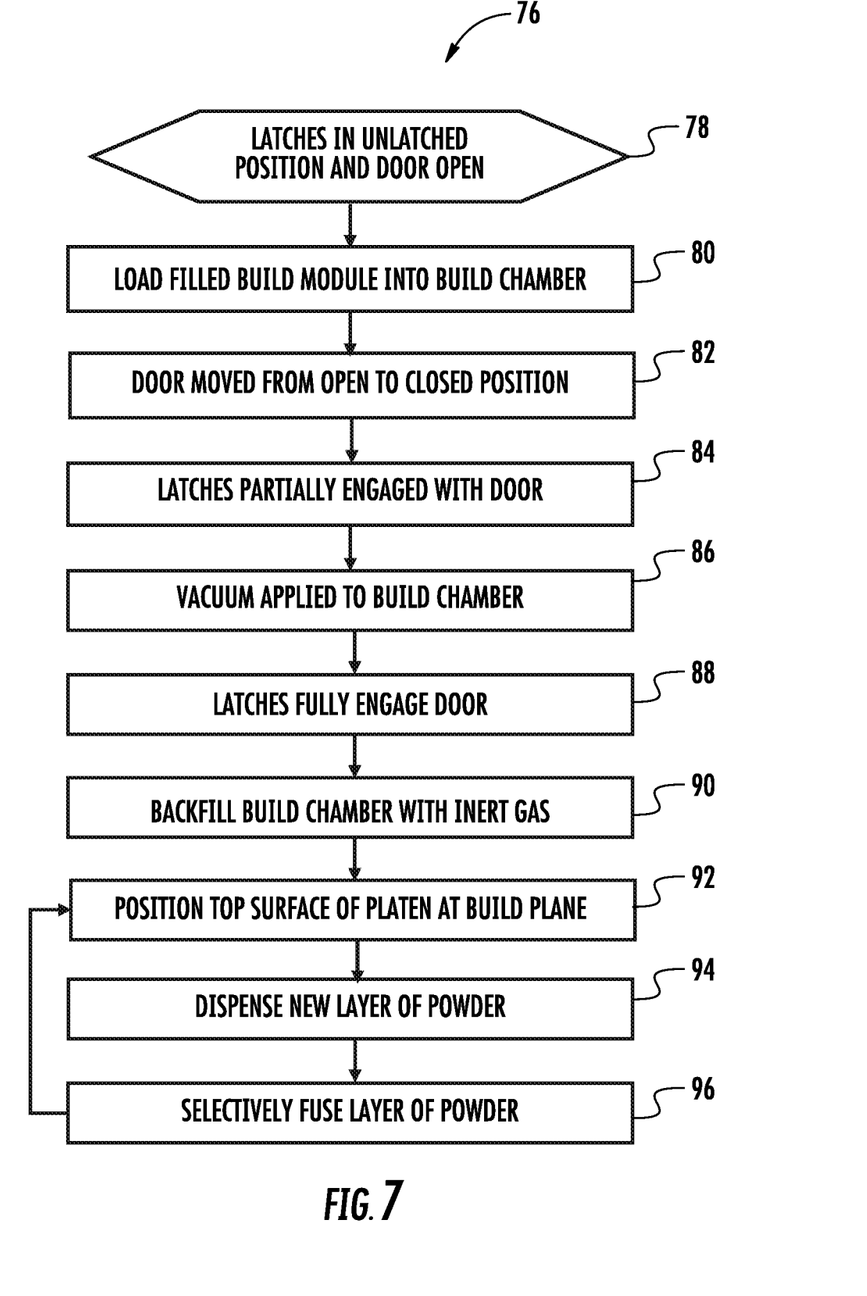
FIG. 7 is a flowchart depicting an embodiment of a manufacturing process using a three-dimensional printing system to fabricate a three-dimensional article.

FIG. 7 is a flowchart depicting an embodiment of a manufacturing process 76 using the three-dimensional printing system 2 for fabricating a three-dimensional article 3. Certain steps of method 76 can be performed by the controller 24 acting upon certain components such as the latches 30, the gas handling system 8, the motorized platen 10, the powder dispenser 12, and the beam system 20. Controller 24 may automatically control any or all of method steps 84-96.

According to 78, the door 28 is open and the latches are in an unlatched state (FIG. 4A). According to 80, a filled build module 74 is loaded into the process chamber 6. The build module 74 can be filled with metal powder. According to 82, the door 28 is moved from an open position (e.g., as illustrated in FIG. 5A) to a closed position (as illustrated in FIG. 2). In an illustrative embodiment, steps 80 and 82 are performed manually.

According to 84, the latches 30 are partially latched or engaged with the door 28, as illustrated in FIG. 4B. The controller 24 can accomplish this by activating and expanding the pneumatic cylinders 46 of the latches 30.

According to 86 the gas handling system 8 applies a vacuum to the process chamber 6 to remove ambient air. This has the effect of applying an inward force on the door 28 along the first lateral axis X (the pressure and force are in the −X direction). The inward force tends to compress the peripheral seal 70 between the door 28 and the chassis 4. This causes a small inward motion (along the X-axis) of the door 28 and results in the latches moving to a fully latched state as illustrated in FIG. 4C and according to step 88.

According to 90, the gas handling system 8 backfills the process chamber 6 with an inert gas such as argon. This re-pressurizes the process chamber 6. The gas pressure forces on the door 28 are very high, but the system of latches 30 maintains a secure seal during subsequent operation steps 92-96.

According to 92, the motorized platen 10 is operated to position a top surface (of platen 10, article 3, or powder 16) at one powder layer thickness below the build plane 18. According to 94, the powder dispenser 12 is operated to dispense a new layer of powder 16 upon the top surface. According to 96, the beam system 20 is operated to selectively fuse the new layer of powder 16. Then steps 92-96 are repeated to complete the fabrication of the three-dimensional article 3.

The specific embodiments and applications thereof described above are for illustrative purposes only and do not preclude modifications and variations encompassed by the scope of the following claims.

What is claimed is:

1. A three-dimensional printing system for manufacturing a three-dimensional article comprising:
   a chassis defining an internal process chamber, the chassis defining a vertical opening surrounded by a peripheral seal and a plurality of latches arranged around the peripheral seal, the latches individually including a hook; and
   a vertical door that is mounted to the chassis by a linkage, the linkage allows the door to translate between open and closed positions, the door including a plurality of laterally extending pins that individually correspond to the latches, the pins having locations along the door to be individually engaged by the latches when the door is positioned in the closed position;

the latches are individually configured to rotate the hooks around a second lateral axis (Y) to engage the pins when the door is positioned in the closed position with the door closing over the opening to secure the door with respect to a first lateral axis (X) that is perpendicular to the second lateral axis (Y).

2. The three-dimensional printing system of claim 1 wherein the plurality of latches (30) includes two vertical arrangements of latches including a first vertical arrangement (64) and a second vertical arrangement (66) that are spaced apart along the second lateral axis (Y).

3. The three-dimensional printing system of claim 2 wherein the first vertical arrangement (64) includes three latches (30) and the second vertical arrangement (66) includes two latches (30).

4. The three-dimensional printing system of claim 2 wherein the linkage (54) has a first vertical axis of rotation on the chassis (4) that is proximate to the second vertical arrangement of latches (30).

5. The three-dimensional printing system of claim 4 wherein the linkage (549 has a second vertical axis of rotation on the door (28) that is generally laterally centered on the door (28).

6. The three-dimensional printing system of claim 4 wherein the second vertical arrangement (66) of latches (30) is between a portion of the peripheral seal (70) and the first vertical axis of rotation on the chassis (4).

7. The three-dimensional printing system of claim 1 wherein the pins (52) generally extend from the door (28) along the second vertical axis (Y).

8. The three-dimensional printing system of claim 1 wherein the latches (30) individually include an actuator (46) that expands to rotate the hook (32) about the second lateral axis (Y) to the engaged position.

9. The three-dimensional printing system of claim 8 wherein the hook (32) has a proximal end (36) and a distal end (38), the distal end (38) defines a concave capture surface (40) for capturing the pin (52).

10. The three-dimensional printing system of claim 9 wherein the latches (30) individually include an upper mount (34) and a lower mount (44), the proximal end (36) of the hook (32) is rotatively mounted to the upper mount (34), the actuator (46) is coupled between the lower mount (44) and the upper mount (34).

11. The three-dimensional printing system of claim 10 wherein the chassis (4) defines a vertical wall (48) with a front side and a back side and a slot (50) therethrough, the upper and lower mounts (34, 44) are attached to a back side of the vertical wall (48), expansion of the actuator (46) causes the hook (32) to extend out of the slot (50) and past the front side of the vertical wall (48) to engage the pin (52).

12. The three-dimensional printing system of claim 1 further comprising:
 a gas handling system (8) coupled to the process chamber (6);
 a motorized platen (10);
 a powder dispenser (12);
 a beam system (20); and
 a controller (24) configured to:
 operate the gas handling system (8) to evacuate ambient air from the process chamber (6);
 operate the gas handling system (8) to backfill the process chamber (6) with an inert gas; and
 operate the motorized platen (10), the powder-dispenser (12), and the beam system (20) to fabricate the three-dimensional article in a layer-by-layer manner.

13. The three-dimensional printing system of claim 12 wherein the hooks (32) individually define a concave capture surface (40) and wherein:
 closing the door (28) causes the hooks (32) to partially engage the pins (52) before evacuation of ambient air, partial engagement is initial rotation leaving a gap between the concave capture surface and the pin (52); and
 evacuation of the ambient air causes the hooks (32) to fully engage the pins (52) with additional rotation of the hook (32) that closes the gap.

\* \* \* \* \*